(12) United States Patent
Wrolson

(10) Patent No.: US 7,923,507 B2
(45) Date of Patent: Apr. 12, 2011

(54) POLYORGANOSILOXANE—CONTAINING COMPOSITIONS

(75) Inventor: Burt M. Wrolson, Dacula, GA (US)

(73) Assignee: Siovation, LLC, Lawrenceville, GA (US)

( * ) Notice: Subject to any disclaimer, the term of this patent is extended or adjusted under 35 U.S.C. 154(b) by 422 days.

(21) Appl. No.: 11/897,443

(22) Filed: Aug. 30, 2007

(65) Prior Publication Data

US 2009/0062458 A1  Mar. 5, 2009

(51) Int. Cl.
 *C08L 83/04* (2006.01)
(52) U.S. Cl. ........ 524/838; 524/588; 524/837; 428/403; 428/404
(58) Field of Classification Search .................. None
 See application file for complete search history.

(56) References Cited

U.S. PATENT DOCUMENTS

| | | |
|---|---|---|
| 2,891,920 A | 6/1959 | Hyde et al. |
| 3,294,725 A | 12/1966 | Findlay et al. |
| 4,221,688 A | 9/1980 | Johnson et al. |
| 4,502,889 A | 3/1985 | Kurita |
| 4,600,436 A | 7/1986 | Traver et al. |
| 5,145,907 A | 9/1992 | Kalinowski et al. |
| 5,674,937 A | 10/1997 | Berg et al. |
| 5,994,459 A | 11/1999 | Berg et al. |
| 6,316,541 B1 | 11/2001 | Gee |
| 6,465,568 B1 | 10/2002 | Gee et al. |
| 6,479,583 B2 | 11/2002 | Halloran et al. |
| 6,627,698 B2 | 9/2003 | Wrolson et al. |
| 7,183,211 B2 | 2/2007 | Konno et al. |
| 2006/0099346 A1 | 5/2006 | Martin et al. |

FOREIGN PATENT DOCUMENTS

WO WO 2006/081910 A1 * 8/2006

OTHER PUBLICATIONS

Product data sheet for Ludox CL.*
Product information sheet for Dow Corning 929 Cationic Emulsion.*

* cited by examiner

*Primary Examiner* — Marc S Zimmer
(74) *Attorney, Agent, or Firm* — Baker Donelson Bearman Caldwell & Berkowitz PC

(57) ABSTRACT

A polyorganosiloxane-containing composition which comprises a cationic emulsion of a polyorganosiloxane and a surface-modified colloidal silica component having a zeta potential greater than zero. This composition optionally contains a silicone-curing catalyst.

14 Claims, No Drawings

POLYORGANOSILOXANE—CONTAINING COMPOSITIONS

TECHNICAL FIELD

The present invention relates to polyorganosiloxane-containing compositions. In a more specific aspect, the present invention relates to cationic emulsions of polyorganosiloxane-containing compositions.

The present invention also relates to a process for the manufacture of polyorganosiloxane-containing compositions.

The present invention also relates to a process for forming an elastomeric film from a polyorganosiloxane-containing composition.

The present invention also relates to a process for treating various surfaces and substrates with polyorgansiloxane-containing compositions.

BACKGROUND OF THE INVENTION

Silicones (more accurately called polymerized siloxanes or polysiloxanes) are mixed inorganic-organic polymers with the chemical formula $[R_2SiO]_n$, where R=organic groups such as methyl, ethyl, and phenyl. These materials consist of an inorganic silicon-oxygen backbone ( ... —Si—O—Si—O—Si—O— ... ) with organic side groups attached to the silicon atoms, which are four-coordinate. In some cases organic side groups can be used to link two or more of these —Si—O— backbones together. By varying the —Si—O— chain lengths, side groups, and crosslinking, silicones can be synthesized with a wide variety of properties and compositions. They can vary in consistency from liquid to gel to rubber to hard plastic. The most common siloxane is linear polydimethylsiloxane, a silicone oil.

Polysiloxane emulsions are well known in the art and may be categorized by the size of the polysiloxane particles and the appearance of the emulsion. Typically three categories of silicone emulsions are recognized in the art-standard emulsions, fine emulsions and microemulsions. The term emulsion used here in encompasses the three individual types of silicone emulsions.

Silicone standard emulsions are characterized by a large particle size (typically greater than 300 nanometers) and appear to the human eye to be opaque (impenetrable to light). Silicone standard emulsions are most commonly identified as those having an intense white appearance. Silicone fine emulsions are characterized by a smaller particle size, from 300 to 140 nanometers, and are identified as those compositions which visually may be slightly opaque to very slightly translucent (transmitting light but with distortions). Silicone microemulsions are characterized as those having a particle size of less than 140 nanometers and visually appear translucent to transparent (transmitting light without distortion).

Out of the three types of silicone emulsions, fine emulsions and microemulsions are generally the most desired due to their smaller particle size and higher stability. Microemulsions are often desired due to their translucent to transparent appearance.

Compositions containing a polyorganosiloxane are well known in the art. For example, liquid waterproofing agents based on polyorganosilxonaes have been developed for use in treating porous, lightweight, fibrous ceramic thermal-insulation materials in both tile (rigid) and blanket (flexible) forms. Whereas silane-based waterproofing materials developed previously for this purpose are toxic and volatile and must be applied in tedious procedures (involving repeated injection at multiple locations by use of syringes), the present formulations are nontoxic and nonvolatile and can be applied by ordinary coating procedures.

Emulsions of polyorganosiloxanes (sometimes referred to as silicones) have been known in the art for many years. Examples of such prior art are:

Hyde & Wehrly U.S. Pat. No. 2,891,920;
Findlay & Weyenberg U.S. Pat. No. 3,294,725;
Johnson, Sam & Schmidt U.S. Pat. No. 4,221,688;
Kevita U.S. Pat. No. 4,502,889;
Traver, Thimneur & Zotto U.S. Pat. No. 4,600,436;
Kalinowski, Liles & Shephard U.S. Pat. No. 5,145,907;
Berg & Joffre U.S. Pat. No. 5,674,937; and
Gee U.S. Pat. No. 6,316,541.

However, there is a need in the industry for new and improved silicones, that is, polyorganosiloxane-containing compositions.

Specifically, there is a need in the industry for new and improved emulsions of polyorganosiloxanes that carry a cationic surface charge and deliver an elastomeric treatment (such as a film) to various surfaces and substrates, such as hair, skin, wood, rubber, synthetic organic polymers, metals, ceramics, fiberglass, flat glass, textiles, etc.

SUMMARY OF THE INVENTION

The present invention provides a water-based, film-forming polyorganosiloxane-containing composition in the form of an emulsion, which has a cationic surface charge and good mechanical properties after the removal of water. This composition can be manufactured by commercial process steps at a reasonable cost.

The present invention also provides a process for the manufacture of these water-based, film-forming compositions.

The present invention also provides a process for forming an elastomeric film from these water-based, film-forming compositions.

The present invention also provides a process for treating various surfaces and substrates with these water-based, film-forming compositions.

In general terms, the water-based, film-forming polyorganosiloxane-containing compositions of the present invention are prepared by combining a surface-modified colloidal silica component having a zeta potential greater than zero and a cationic emulsion of a polyorganosiloxane. Although the "water-based" feature is generally provided by the water content of either or both of the two essential components defined above, additional water can be optionally added to the composition.

The polyorganosiloxane-containing compositions of this invention can be prepared by conventional processing techniques, such as emulsion polymerization, mechanical emulsification and suspension polymerization.

DETAILED DESCRIPTION OF THE INVENTION

In accordance with the present invention, these compositions contain particles of a polyorganosiloxane comprised of the following monomeric units:

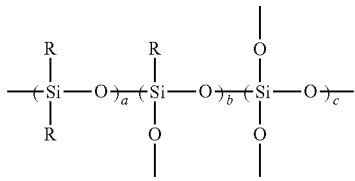

wherein each R is independently selected from a saturated or unsaturated alkyl group of 1-6 carbon atoms; a saturated or unsaturated aryl group of 6-10 carbon atoms; $R^1Q$;

—(—$R^1Q^1$-)$_d$; and $R^1Q^1T$. Examples of suitable R groups are methyl, ethyl, propyl, phenyl, allyl and vinyl.

In the above formula, each $R^1$ is independently selected from an alkylene group of 1-6 carbon atoms or an arylene group of 6-10 carbon atoms; each Q is independently selected from a functional group such as amine, halogen, carboxy or mercapto; each $Q^1$ is independently selected from a non-carbon atom such as oxygen, nitrogen or sulfur; and each T is independently selected from a saturated or unsaturated alkyl group of 1-6 carbon atoms or a saturated or unsaturated aryl group of 6-10 carbon atoms.

In the above formula where R is -($R^1$-$Q^1$-)$_d$, the d represents a degree of polymerization of a repeating —$R^1$-$Q^1$- unit. For example, if d is 2, then the structure is —$R^1$-$Q^1$-$R^1$-$Q^1$-. In any case, the d can vary from 2 to about 40.

In the above formula, R can also be a bridging group between silicon atoms formed by the addition reaction of an amine group with a glycidyl group. The polyorganosiloxane can be either monofunctional where R is the same throughout the polymer or polyfunctional where the polymer contains two or more different R groups as defined above.

The polyorganosiloxane may be fully cured or partially cured with any catalyst known in the art for inducing condensation cure reactions. Examples of such catalysts are organic amines, organic tin compounds, organic titanates and organic zinc compounds. In the former case (fully cured), essentially no chain stopping groups will be present in the polymer. In the latter case (partially cured), one or more of the following chain stopping groups may be present in the polyorganosiloxane:

Case A

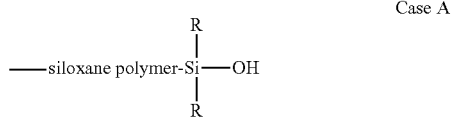

where R is as defined above.

Case B

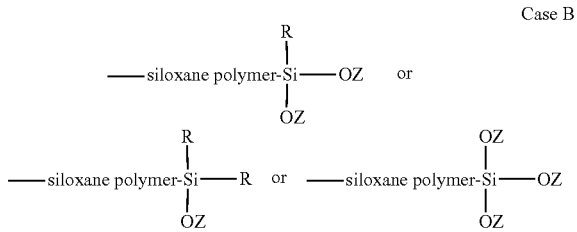

where R is as defined above, and Z is independently selected from methyl, ethyl, propyl and butyl. Isomers of the above structures are included.

Case C

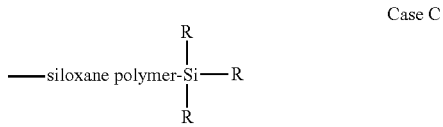

where R is as defined above.

The a monomeric unit comprises from about 50 to about 99.9 mole percent of the polyorganosiloxane, the b monomeric unit comprises from about 0 to about 30 mole percent of the polyorganosiloxane and the c monomeric unit comprises from about 0 to about 30 mole percent of the polyorganosiloxane, provided that the sum of b+c must be greater than 0.

Emulsions of use in this invention have a mean particle size of from about 5 nanometers (nm) to about 100 microns (µm). The emulsion may optionally contain cationic emulsifiers/surfactants, cationic organic polymers, cationic siloxane polymers or combinations of these components, provided that the zeta potential of the emulsion is greater than 0, i.e., positive. The emulsions may optionally contain nonionic emulsifiers/surfactants.

Emulsions containing polyorganosiloxanes can be produced by emulsion polymerization methods and mechanical emulsification methods.

Emulsions containing polyorganosiloxanes of this structure may optionally contain cationic surfactants such as the various fatty acid amines, amides and derivatives, and salts of fatty acid amines and amides. Cationic surfactants can also be exemplified by aliphatic fatty amines and derivatives such as dodecyl amine acetate, octadecyl amine acetate and acetates of amines of tallow fatty acids; homologues of aromatic amines having fatty chains such as dodecyl aniline; fatty amides derived from aliphatic diamines such as undecyl imidazoline; fatty amides derived from di-substituted amines such as oleylamino diethylamine; derivatives of ethylene diamine; quaternary ammonium compounds such as tallow trimethylammonium chloride, dioctadecyldimethyl ammonium chloride, didodecyldimethyl ammonium chloride and dihexadecyldimethyl ammonium chloride; amide derivatives of amino alcohols such as beta-hydroxyethyl stearyl amide; amine salts of long chain fatty acids; quaternary ammonium bases derived from fatty amides of di-substituted diamines such as oleylbenzylamino ethylene diethylamine hydrochloride; quaternary ammonium bases of benzimidazolines such as methylheptadecyl benzimidazole hydrobromide; basic compounds of pyridinium and derivatives such as cetylpyridinium chloride; sulfonium compounds such as octadecyl sulfonium methyl sulfate; quaternary ammonium compounds of betaine such as betaine compounds of diethylamino acetic acid and octadecylchloromethyl ether; urethanes of ethylene diamine such as condensation products of stearic acid and diethylene triamine; polyethylene diamines; and polypropanol polyethanol amines. Commercial cationic surfactants include products sold under the trademarks ARQUAD T-27W, 16-29, C-33, and T-50; and ETHOQUAD T/13 and T/13 ACETATE; by Akzo Chemicals Inc., Chicago, Ill.

Useful nonionic surfactants have a hydrophilic-lipophilic balance (HLB) of 3-20, and can be from any of the known chemical families, including ethoxylated straight chain alcohols, ethoxylated branched chain alcohols, sorbitan esters, ethoxylated sorbitan esters, sucrose esters, ethoxylated alkylamines, fatty amine oxides, ethylene oxide-propylene oxide block copolymers, ethoxylated alkylphenols, alkanolamides, ethoxylated fatty acid esters, ethoxylated glycerides, glycerol esters, polyglycerol esters, glycol esters, alkyl polyglucosides and alkoxylated polysiloxanes. Commercial nonionic surfactants include 2,6,8-trimethyl-4-nonyloxy polyethylene oxyethanols (6EO and 10EO) sold under the trademarks TERGITOL TMN-6 and TERGITOL TMN-10; alkyleneoxy polyethylene oxyethanol ($C_{11-15}$ secondary alcohol ethoxylates 7EO, 15EO, and 20EO) sold under the trademarks TERGITOL 15-S-7, TERGITOL 15-S-9 and TERGITOL 15-S-15; octylphenoxy polyethoxy ethanol (40EO) sold under the trademark TRITON X-405; polyoxyethylene (20) sorbitan monostearate sold under the trademark TWEEN 60; and $C_{11}$ oxo alcohol ethoxylate (5 EO) sold under the trademark GENAPOL UD-050.

Either during the process of preparing the emulsion of this invention or in a distinctly separate processing step, the emulsion and surface-modified colloidal silica are combined. The surface-modified colloidal silica contains a sufficient quantity of a coating that reverses the surface charge of the colloidal silica from anionic to cationic, meaning that the zeta potential of the colloidal silica changes from less than zero, i.e., negative, to greater than zero, i.e., positive.

Surface-modified colloidal silicas of use in this invention have a mean particle size in the range of from about 0.1 to about 150 nanometers (nm). The use of surface-modified colloidal silica is a distinguishing feature of this invention. Without the surface modification described in this invention, mixtures of cationic silicone emulsions and colloidal silica generally form an undesirable precipitate, thereby rendering the compositions virtually useless.

In this invention, the polyorganosiloxane-containing composition comprises, on a dry basis, from about 0.1 to about 150.0 parts of the surface-modified colloidal silica component per 100.0 parts of polyorganosiloxane.

As used within the scope of this invention, the term "colloidal silica" (also known as "silica sol") refers to a class of well known materials that are produced by the neutralization with demetalization or deionization and subsequent concentration of water glass. One well known manufacturer of colloid silica is Nalco Chemical Company, Naperville, Ill. Colloidal silica carries an anionic surface charge, by nature. Colloidal silica is commercially available under the trademarks NALCO 1115 and 1130.

Surface modification of colloidal silica within the scope of this invention is accomplished by the reaction of metallic elements to the surface of colloidal silica to create a thin layer of water-insoluble metallic oxide that will partially dissociate in the presence of water under system-specific pH conditions to yield particles with a positive surface charge. Metallic elements within the scope of this invention include aluminum, titanium, iron, zirconium, zinc and magnesium. The surface modification is not only technically necessary to achieve compatibility with cationic emulsions of polyorganosiloxanes, but desired from an economic point of view compared to the use of pure, cationically charged metallic oxide sols. The base material, colloidal silica, is readily available at a substantial economy of scale. Only a small amount, by mass, of surface modification is required to reverse the charge of colloidal silica; therefore, the resulting materials are generally cost-effective. As a consequence, materials produced within the scope of this invention are of practical economic use in many different applications. Of particular use in this invention is alumina-coated colloidal silica.

Commercially available examples of alumina-coated colloidal silica generally differ in terms of particle size and alumina content. Alumina-coated colloidal silicas of use in this invention have a mean particle size from about 1 nanometer (0.001 microns) to about 150 nanometers (0.15 microns), preferably from about 1 nanometer (0.001 microns) to about 100 nanometers (0.1 microns). Alumina-coated colloidal silicas of use in this invention have an alumina concentration of from about 0.1 to about 25.0% by weight of total oxide (alumina and silica), preferably from about 0.1 to about 10% by weight of total oxide (alumina and silica).

Alumina-coated colloidal silicas of use in this invention have a pH from about 2 to about 9, preferably from about 3 to about 7. Alumina-coated colloidal silicas of use in this invention have a total oxide concentration of less than about 60% by weight, preferably less than about 40% by weight. Alumina-coated colloidal silicas of use in this invention have a zeta potential greater than 0, i.e., positive. Examples of commercially available alumina-coated silicas include, but are not limited to, products under the trademarks NALCO 1056 (Nalco Chemical Company); BINDZIL CAT 80 (Eka Chemicals Inc., Marietta, Ga. 30062) and WESOL P (WesBond Corporation, Wilmington, Del. 19801).

The resultant emulsion is stable under a wide range of environmental conditions. Films obtained by drying emulsions prepared within the scope of this invention are substantially stronger than films prepared from cationic emulsions of polyorganosiloxane that do not contain surface-modified colloidal silica. Optionally, additional components can be added to emulsions prepared within the scope of this invention without departing from the essence of the invention. Examples of such components are preservatives, biocides, chelating agents, static control agents, defoaming agents, antifoaming agents, wetting agents, adhesion promoters, humectants, thickening agents, suspending agents, rust inhibitors and freeze/thaw additives.

Emulsions prepared in accordance with this invention are useful as components of hard surface polishes, parting agents between molded plastic parts and mold surfaces (also commonly known as release agents), hydrophobic finishes in automotive appearance formulations, conditioning agents in hair care formulations and sizing agents for fiberglass and textiles.

The present invention is further illustrated by the following examples which are illustrative of certain embodiments designed to teach those of ordinary skill in this art how to practice this invention and to represent the best mode contemplated for carrying out this invention.

Example 1

A base silicone emulsion was prepared as follows. 10.0 parts of a silanol-terminated polydimethylsiloxane (available under the trademark Q13563 from Dow Corning Corporation, Midland, Mich.), 1.50 parts of γ-glycidoxypropyltrimethoxysilane (available under the trademark Z-6040 from Dow Corning) and 28.50 parts of an aminoethylaminopropyl-functional siloxane polymer (available under the trademark RHODORSIL OIL 21642 from Bluestar Silicones, Lyon, France) were added to a mixing vessel equipped with an agitator and a motor. These three materials were mixed for approximately thirty minutes to form a uniform composition.

Next, the following three materials were added to the vessel in the order given while mixing: 7.20 parts of $C_{11}$ oxo alcohol ethoxylate (5 moles of ethylene oxide, available under the trademark GENAPOL UD-050 from Clariant Corporation, Charlotte, N.C.), 4.80 parts of $C_{11}$ oxo alcohol ethoxylate (11 moles of ethylene oxide, available under the trademark GENAPOL UD-110 from Clariant) and 0.10 parts of glacial acetic acid. The resulting composition was mixed for approximately sixty minutes. 7.50 parts of water (municipal water available in Lawrenceville, Ga.) were added to the vessel and mixed for approximately sixty minutes. 10.0 parts of water were added to the vessel and mixed for approximately ninety minutes. 10.0 parts of water were added to the vessel and mixed for approximately sixty minutes. 10.0 parts of water were added to the vessel and mixed for approximately thirty minutes.

Next, the following three materials were added to the vessel in the order given while mixing: 0.03 parts of sodium chloride, 0.05 parts of disodium ethylenediaminetetraacetic acid and 0.30 parts of KATHON LX 1.5%. The resulting composition was mixed for approximately thirty minutes.

Finally, 0.30 parts of glacial acetic acid and 9.72 parts of water were added to the vessel and mixed for approximately 30 minutes. The resulting emulsion was aged for approximately seven days to complete the silicone curing reactions.

The mean particle size of this emulsion was measured with a Nanotrac NPA 150 Particle Size Analyzer (Microtrac Inc., Montgomeryville, Pa.) and found to be approximately 100 nanometers. This base silicone emulsion carries a cationic surface charge by virtue of the presence of protonated amino groups within the siloxane polymer network.

An intermediate silicone emulsion was prepared as follows. 6,817 parts of the base silicone emulsion described above were added to a mixing vessel equipped with an agitator and a motor. 3,500 parts of water were added with mixing. Without delay, 708 parts of hexadecyl trimethyl ammonium chloride solution (available under the trademark ARQUAD 16-29 from Akzo Nobel Surface Chemistry LLC, Chicago, Ill.) were added with mixing. Without delay, 11 parts of DOWICIL 75 (available from Dow Chemical Company, Midland, Mich.) were added with mixing. This composition was mixed for approximately fifteen minutes, after which 499 parts of water were added to adjust the solids content to approximately 30% by weight as measured with a DSC HFT-2000 Moisture Analyzer (Data Support Company, Inc., Encino, Calif.).

A final silicone emulsion was prepared as follows. 173 parts of the intermediate silicone emulsion described above were added to a mixing vessel equipped with an agitator and a motor. 27 parts of alumina-coated colloidal silica (available under the trademark WESOL P from WesBond Corporation) were added with mixing. The alumina-coated colloidal silica had a median particle size of approximately 22 nanometers (as measured by a Nanotrac NPA 150 Particle Size Analyzer), an alumina:silica ratio of 4:26, a total oxide content of 30% by weight and a pH of 4.5. This composition was mixed for approximately fifteen minutes. The solids content was approximately 30% by weight as measured with a DSC HFT-2000 Moisture Analyzer, and the pH was approximately 4.7.

Ten (10) grams of this final silicone emulsion were placed in a 15 ml capacity centrifuge tube and centrifuged (model accuSpin 400, Fisher Scientific) for 30 minutes at 3,000 rpm. No separation of any kind was evident in the centrifuged sample. Additionally, negligible separation was observed in a sample that was left undisturbed for 83 days at 20-25° C.

Aging studies on different samples of this composition have demonstrated that emulsions of this type are shelf-stable for at least six months.

Example 2

300.0 grams of Dow Corning 929 emulsion were added to a mixing vessel. This product is a 35% active, cationic, oil-in-water emulsion of an aminofunctional polydimethylsiloxane. While mixing with an overhead mixer, 30.2 grams of water were added to the emulsion. The resultant emulsion had a solids content of 29.4% as measured with a DSC HFT-2000 Moisture Analyzer.

150.0 grams of this diluted emulsion were added to a separate mixing vessel. 52.0 grams of the alumina-coated colloidal silica described in Example 1 were added to the diluted emulsion. The two materials were mixed until visually uniform. The resulting final emulsion was free of coagulum.

10 grams of this final emulsion were placed in a 15 ml capacity centrifuge tube and centrifuged for 30 minutes at 3,000 rpm. No separation of any kind was evident in the centrifuged sample. 8.0 grams of this final emulsion were placed in a cylindrical container made of polystyrene (maximum volume of 8 U.S. liquid ounces) and allowed to evaporate for 72 hours under ambient conditions. The resulting film was somewhat tacky and elastomeric.

Example 3

Catalyst Addition

An emulsion of dioctyltindilaurate catalyst was prepared as follows. 7.5 parts of water were added to a two-liter stainless steel beaker equipped with an overhead mixer and an agitator. 3.0 parts of C11 oxo alcohol ethoxylate as described in Example 1 (5 moles of ethylene oxide) were added and mixed until uniform. 2.0 parts of $C_{11}$ oxo alcohol ethoxylate (11 moles of ethylene oxide) were added and mixed until uniform. 50.0 parts of dioctyltindilaurate (available under the trademark TEGOKAT 216 from Goldschmidt Industrial Chemical Corporation, McDonald, Pa.) were gradually added and mixed until a viscous, gel-like emulsion formed. The beaker was moved to a Hockmeyer Disperser (Hockmeyer Equipment Corporation, Harrison, N.J.) and processed at 2,800 revolutions per minute to form a very viscous, gel-like emulsion. 37.4 parts of water were added, and the emulsion was further processed with the disperser until uniform. 0.1 parts of DOWICIL 75 as described in Example 1 were added and mixed until uniform.

185 grams of the final silicone emulsion, prepared in accordance with Example 1, were added to a cylindrical container made of polystyrene (maximum volume of 8 U.S. liquid ounces). A Teflon stir bar was added, and the final silicone emulsion was mixed moderately with a magnetically-driven stirring plate. 5 grams of catalyst emulsion, described above, were added to the final silicone emulsion and mixed for 10 minutes. 10 grams of the resulting emulsion were placed in a 15 ml capacity centrifuge tube and centrifuged for 30 minutes at 3,000 rpm.

No separation of any kind was evident in the centrifuged sample. Aging studies have shown that emulsions of this type are shelf stable for at least four months.

Example 4

Comparative 8.0 grams of the diluted emulsion described in Example 2 (29.4% solids content) were placed in a cylindrical container made of polystyrene (maximum volume of 8 U.S. liquid ounces) and allowed to evaporate for 72 hours under ambient conditions. The resulting film was slightly elastomeric and relatively low in strength compared to the resulting film described in Example 2.

This film strength difference is attributable to the presence of the alumina-coated colloidal silica described in Example 2.

Example 5

Comparative 75 grams of the base silicone emulsion, prepared in accordance with Example 1, were added to a cylindrical container made of polystyrene (maximum volume of 8 U.S. liquid ounces). A Teflon stir bar was added, and the base silicone emulsion was mixed moderately with a magnetically-driven stirring plate. 50 grams of water were added and mixing continued for five minutes. Next, 40 grams of Nalco 1115 colloidal silica (Nalco Chemical Company) were added and mixing continued for approximately five minutes. (Nalco 1115 is a colloidal silica with a particle size of approximately 4 nanometers, a silicon dioxide concentration of 15% by weight and a pH of 10.5).

The resulting mixture was observed and found to contain a substantial amount of precipitate and was generally non-uniform (i.e., unstable) in appearance.

Example 6

Comparative

Comparative Example 5 was repeated with the exception of replacing Nalco 1115 collodial silica with Nalco 1130 colloidal silica. (Nalco 1130 is a colloidal silica with a particle size of approximately 8 nanometers, a silicon dioxide concentration of 30% by weight and a pH of 10). As was the case with Comparative Example 5, this mixture was also unstable.

Example 7

Comparative 8.0 grams of the intermediate silicone emulsion, prepared in accordance with Example 1, were placed in a cylindrical container made of polystyrene (maximum volume of 8 U.S. liquid ounces) and allowed to evaporate for 72 hours under ambient conditions. The resulting film was slightly elastomeric, contained free oil droplets on top of the film and was relatively low in strength.

By way of comparison, 8.0 grams of the final silicone emulsion, prepared in accordance with Example 1, were placed in a cylindrical container made of polystyrene (maximum volume of 8 U.S. liquid ounces) and allowed to evaporate for 72 hours under ambient conditions. The resulting film was cohesive, elastomeric and relatively high in strength compared to the resulting film from the intermediate silicone emulsion. This film strength difference is attributable to the presence of the alumina-coated colloidal silica described in Example 1.

This invention has been described in detail with particular reference to certain embodiments, but variations and modifications can be made without departing from the spirit and scope of the invention as defined in the following claims.

What is claimed is:

1. An elastomeric film formed from a polyorganosiloxane-containing composition which comprises:
   A. a cationic emulsion of a polyorganosiloxane and
   B. a surface-modified colloidal silica component having a zeta potential greater than zero,
   wherein the composition forms an elastomeric film upon the removal of water from the composition and wherein the polyorganosiloxane is comprised of the following monomeric units:

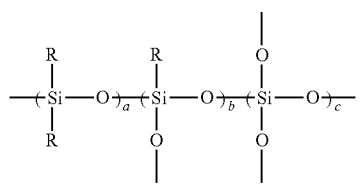

wherein each R is independently selected from a saturated or unsaturated alkyl group of 1-6 carbon atoms; a saturated or unsaturated aryl group of 6-10 carbon atoms; $R^1Q$; and $R^1Q^1T$; and wherein each $R^1$ is independently selected from an alkylene group of 1-6 carbon atoms or an arylene group of 6-10 carbon atoms; and wherein each Q is independently selected from a functional group; and wherein each $Q^1$ is independently selected from a non-carbon atom; and wherein each T is independently selected from a saturated or unsaturated alkyl group of 1-6 carbon atoms or a saturated or unsaturated aryl group of 6-10 carbon atoms; and wherein the a monomeric unit comprises from about 50 to about 99.9 mole percent of the polyorganosiloxane, the b monomeric unit comprises from about 0 to about 30 mole percent of the polyorganosiloxane and the c monomeric unit comprises from about 0 to about 30 percent of the polyorganosiloxane, provided that the sum of b & c must be greater than 0.

2. A composition as defined by claim 1 wherein each Q is independently selected from an amine, amide, halogen, carboxy or mercapto group.

3. A composition as defined by claim 1 wherein each $Q^1$ is independently selected from an oxygen, nitrogen or sulfur atom.

4. A polyorganosiloxane-containing composition as defined by claim 1 which additionally contains a silicone-curing catalyst.

5. A composition as defined by claim 1 wherein the colloidal silica component is an alumina-coated colloidal silica.

6. A method of treating a surface or substrate selected from the group consisting of hair, skin, wood, rubber, synthetic organic polymers, metals, ceramics, fiberglass, flat glass and textiles, wherein the process comprises applying to the surface or substrate the composition defined in claim 1.

7. An elastomeric film as defined by claim 1 wherein the colloidal silica component of the polyorganosiloxane-containing composition is present in an amount, on a dry basis, from about 0.1 to about 150.0 parts per 100.0 parts of polyorganosiloxane.

8. A process for the manufacture of an elastomeric film from a polyorganosiloxane-containing composition, wherein the process comprises combining a surface-modified colloidal silica component having a zeta potential greater than zero and a cationic emulsion of a polyorganosiloxane, and then removing water from the composition, wherein the polyorganosiloxane is comprised of the following monomeric units:

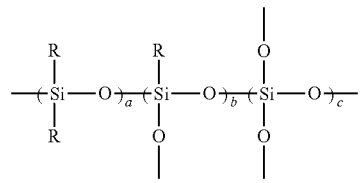

wherein each R is independently selected from a saturated or unsaturated alkyl group of 1-6 carbon atoms; a saturated or unsaturated aryl group of 6-10 carbon atoms; $R^1Q$; and $R^1Q^1T$; and wherein each $R^I$ is independently selected from an alkylene group of 1-6 carbon atoms or an arylene group of 6-10 carbon atoms; and wherein each Q is independently selected from a functional group; and wherein each $Q^1$ is independently selected from a non-carbon atom; and wherein each T is independently selected from a saturated or unsaturated alkyl group of 1-6 carbon atoms or a saturated or unsaturated aryl group of 6-10 carbon atoms; and wherein the a monomeric unit comprises from about 50 to about 99.9 mole percent of the polyorganosiloxane, the b monomeric unit comprises from about 0 to about 30 mole percent of the polyorganosiloxane and the c monomeric unit comprises from about 0 to about 30 percent of the polyorganosiloxane, provided that the sum of b & c must be greater than 0.

9. A process as defined by claim 8 wherein each Q is independently selected from an amine, amide, halogen, carboxy or mercapto group.

10. A process as defined by claim 8 wherein each $Q^1$ is independently selected from an oxygen, nitrogen or sulfur atom.

11. A process as defined by claim 8 which additionally comprises adding a silicone-curing catalyst to the cationic emulsion prior to or after addition of the colloidal silica component.

12. A process as defined by claim 8 wherein the polyorganosiloxane-containing composition additionally contains a silicone-curing catalyst.

13. A method of treating a surface or substrate selected from the group consisting of hair, skin, wood, rubber, synthetic organic polymer, metal, ceramic, fiberglass, flat glass and textile, wherein the process comprises applying to the surface or substrate the composition prepared according to the process defined in claim 8.

14. A process as defined by claim 8 wherein the colloidal silica component is added during the manufacture of the cationic emulsion of the polyorganosiloxane.

* * * * *